Patented Oct. 29, 1940

2,219,879

UNITED STATES PATENT OFFICE 2,219,879

PRODUCTION OF ALKYLAMINES

Byron M. Vanderbilt, Roselle Park, N. J., assignor to Commercial Solvents Corporation, Terre Haute, Ind., a corporation of Maryland No Drawing. Application December 14, 1938, Serial No. 245,618

4 Claims. (Cl. 260—583)

My invention relates to the production of alkylamines, and more particularly to an improved process for the production of dialkylamines.

It has been known that monoalkylamines could be prepared by condensing an aliphatic aldehyde and ammonia, and subjecting the resulting condensation product to hydrogenation, in accordance with the following reactions:

$$RCHO + NH_3 \longrightarrow R-\underset{NH_2}{\underset{|}{C}}-OH \rightleftarrows R\overset{H}{C}=NH+H_2O$$

$$R-\underset{NH_2}{\underset{|}{C}}-OH + H_2 \longrightarrow RCH_2NH_2 + H_2O$$

$$R-\overset{H}{C}=NH + H_2 \longrightarrow RCH_2NH_2$$

According to this process, relatively high yields of monoalkylamines can be produced, but certain amounts of di- and trialkylamines are also formed, and it is believed that the following reactions take place, in addition to those specified above:

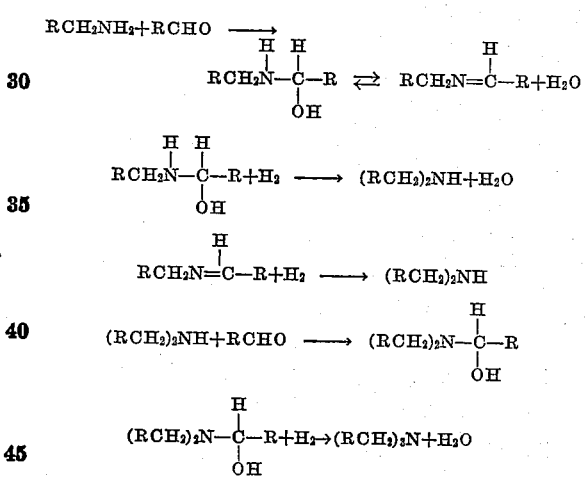

Commercial demands for dialkylamines have made it desirable to produce these materials as primary reaction products, with only minor amounts of the other amines, and the above reactions have been investigated from this viewpoint. In view of the fact that 2 mols of the aldehyde are required for 1 mol of ammonia in the production of dialkylamines, it appeared that such a molecular proportion for the primary condensation reaction should give rise to the production of primarily dialkylamines in the final hydrogenation. On experimental investigation, however, this was found not to be the case. Further possibilities indicated by the above equations have also been investigated, with negative results. These have included the condensation of 1 mol of aldehyde and one mol of ammonia, followed by the addition of a mol of monoalkylamine, and subsequent reduction; the condensation of 1 mol of aldehyde and 1 mol of ammonia, the hydrogenation of this condensation product, the condensation of a second mol of aldehyde with the hydrogenated product, and the subsequent hydrogenation of the second condensation product; and the condensation of 1 mol of aldehyde with 1 mol of monoalkylamine, with subsequent hydrogenation of the condensation product. In view of the negative results with all of these possible reactions, it has appeared impossible to produce primarily dialkylamines by the aldehyde-ammonia condensation method.

However, I have now discovered a procedure in accordance with which dialkylamines may be obtained in high yields with substantial exclusion of mono- and tri-alkylamines in the reaction products. In accordance with my process, 1 mol of aldehyde is condensed with approximately one-half mol of ammonia and approximately one-half mol of monoalkylamine. The resulting condensation product is subjected to hydrogenation, and the monoalkylamine appearing in the reaction products is utilized as the monoalkylamine reactant for the succeeding batch. It is seen that my process is thus cyclic in nature, and I have found that by suitably regulating the proportion of ammonia and monoalkylamine in the reactant mixture, only the exact amount of monoalkylamine required for the succeeding batch will be produced, and the products therefore consist solely of dialkylamine and a small amount of trialkylamine.

My process is generally applicable to the production of dialkylamines from ammonia and aldehydes containing at least 2 carbon atoms. The initial condensation reaction, which constitutes the most important phase of my invention, may be carried out with any aliphatic aldehyde containing at least 2 carbon atoms, but somewhat lower yields may be obtained in the reduction of the condensation products prepared from high molecular weight aldehydes, in view of the tendency of such condensation products to decompose. My invention is particularly applicable to the production of amines from ammonia and aldehydes containing from 2 to 5 carbon atoms, and the specific examples illustrating my process employ such aldehydes. It is to be distinctly understood, however, that my process is operative with any aldehydes containing at least 2 carbon atoms.

Both the condensation and hydrogenation steps of the process are suitably effected in the presence of a solvent, which may be the same for both reactions. Any solvent which is chemically inert in the process, and in which ammonia and the aldehydes and amines involved are soluble, is satisfactory for this purpose. I prefer to employ an aliphatic alcohol, and preferably methanol, but any other inert solvent may be used if desired.

I prefer to employ a ratio of ammonia to monoalkylamine, in the condensation reaction, ranging from 0.75 mol to 1.0 mol of ammonia per mol of monoalkylamine. However, as pointed out above, approximately equimolecular proportions will be satisfactory in all cases, and the optimum will constitute the ratio producing the exact amount of monalkylamine for use in the succeeding batch, under the particular operating conditions employed. I also prefer to employ a ratio of aldehyde to total bases in the initial reaction mixture ranging from 0.85 mol to 1.0 mol of aldehyde per mol of total bases. This ratio of reactants improved the total yield, but is not as important from the standpoint of the ratio of products formed as is the ratio of ammonia to monoalkylamine in the reaction mixture.

In carrying out the initial condensation, I prefer to effect the reaction at relatively low temperatures, e. g., 10–30° C. and preferably 10–12° C. This reaction is exothermic in nature, and the maintenance of low temperature during the initial stages of the reaction may require external cooling. At the conclusion of the exothermic stage of the reaction, I prefer to allow the temperature of the reaction mixture to rise to room temperature, or somewhat higher, e. g., 30–40° C., and remain at this point for from 10 to 30 minutes, to insure complete reaction. This procedure for effecting the condensation reaction is preferred from the standpoint of securing optimum yields, but it is to be understood that my present invention may be applied in conjunction with any of the previously employed processes for effecting this type of condensation.

While the condensation product produced as described above may be reduced in any known manner to form the aliphatic amines, I prefer to subject the condensation reaction mixture, without any further treatment, to liquid phase hydrogenation at relatively low temperatures. Relatively high temperatures tend to decompose the condensation products, and thus lower the yield of amines, and for this reason I prefer to employ hydrogenation catalysts which are active at low temperatures, preferably below 120° C. I have found that a catalyst prepared by leaching aluminum from an aluminum-nickel alloy, by the use of strong alkali, is extremely satisfactory for this purpose, and may be employed at temperatures ranging from room temperature to 80° C. It is to be understood, however, that my invention is not limited to the use of any particular catalyst or method of effecting the hydrogenation reaction. Undesirable conditions for the reduction reaction will result in lower yields of amines, but the improved ratio of amines produced by my process will nevertheless be secured.

My invention may be illustrated by the following specific examples, in which my improved process is compared with other processes for effecting this reaction:

Example I

Butyraldehyde was added to a solution of ammonia in ethyl alcohol in a ratio of 2 mols of butyraldehyde per mol of ammonia, the addition being made at approximately room temperature, and sufficiently slowly to avoid undue heating of the mixture. The resulting solution was then subjected to hydrogenation at room temperature at approximately 1000 lbs. hydrogen pressure, in the presence of a catalyst prepared by leaching aluminum from an aluminum-nickel alloy by means of strong alkali. At the conclusion of the hydrogenation reaction, as evidenced by failure of the solution to absorb further hydrogen, the reaction mixture was fractionated to separate the resulting amines. The following yields of amines were secured (expressed as per cent of the theoretical based on the aldehyde in the reactant mixture):

| | Per cent |
|---|---|
| Monobutylamine | 31.0 |
| Dibutylamine | 17.0 |
| Tributylamine | 8.0 |

Example II

The procedure of Example I was repeated with the exception that only 1 mol of butyraldehyde was employed per mol of ammonia, and at the conclusion of the condensation reaction and before hydrogenation, an equimolecular amount of monobutylamine was introduced. The following yields of amines were secured:

| | Per cent |
|---|---|
| Monobutylamine* | 45.0 |
| Dibutylamine | 48.8 |
| Tributylamine | 0.3 |

*Monobutylamine included in the reactant mixture for the hydrogenation was entirely recovered, and is not reported in the yield.

Example III

The procedure of Example II was followed in forming the initial condensation product of one mol of aldehyde and one mol of ammonia. This condensation product was then subjected to hydrogenation; following which butyraldehyde was again introduced in an amount equivalent to the molar concentration of initial ammonia, and this second condensation product was then subjected to hydrogenation. The following yields were secured:

| | Per cent |
|---|---|
| Monobutylamine | 15.5 |
| Dibutylamine | 40.0 |
| Tributylamine | 21.8 |

Example IV

Butyraldehyde was condensed with an equimolecular amount of monobutylamine, effecting the condensation under the same conditions specified for the initial condensation in Example II. The resulting mixture was hydrogenated under the conditions specified in Example II, and the following yields were secured:

| | Per cent |
|---|---|
| Dibutylamine | 48.0 |
| Tributylamine | 46.7 |

Example V

Butyraldehyde was condensed with an equimolecular amount of bases consisting of 50 mol per cent ammonia and 50 mol per cent monobutylamine, in a ratio of 0.94 mol butyraldehyde per mol of total bases, under the reaction conditions specified for the initial condensation in Example II. The resulting mixture was subjected to hydrogenation under the conditions specified in Example II, and the following yields were secured:

| | Per cent |
|---|---|
| Monobutylamine* | 5.3 |
| Dibutylamine | 71.5 |
| Tributylamine | 5.7 |

*Monobutylamine included in original reaction mixture was entirely recovered and is not reported in yield.

*Example VI*

Butyraldehyde was condensed with a mixture of .45 mol per cent of ammonia, 0.55 mol per cent monobutylamine, in a ratio of 0.90 mol butyraldehyde per mol of total bases, in solution in methanol under the reaction conditions specified for the initial condensation in Example II. The resulting mixture was subjected to hydrogenation under the conditions specified in Example II, and the following yields were secured:

| | Per cent |
|---|---|
| Monobutylamine* | 2.0 |
| Dibutylamine | 79.5 |
| Tributylamine | 7.0 |

*Monobutylamine included in original reaction mixture was entirely recovered and is not reported in yield.

*Example VII*

Acetaldehyde was condensed with monoethylamine in a ratio of 0.94 mol of acetaldehyde per mol of monoethylamine, in solution in butanol under the reaction conditions specified for the initial condensation in Example II, and the resulting mixture was subjected to hydrogenation under the conditions specified in Example II. The following yields were secured:

| | Per cent |
|---|---|
| Diethylamine | 54.5 |
| Triethylamine | 19.0 |

*Example VIII*

Acetaldehyde was condensed with an equimolecular mixture of ammonia and monoethylamine in a ratio of 0.94 mol acetaldehyde per mol of total bases, in solution in butanol under the reaction conditions specified for the initial condensation in Example II. The resulting mixture was subjected to hydrogenation under the conditions specified in Example II, and the following yields were secured:

| | Per cent |
|---|---|
| Monoethylamine* | 4.4 |
| Diethylamine | 67.6 |
| Triethylamine | 1.7 |

*Monoethylamine included in original reaction mixture was entirely recovered and is not reported in yield.

The improvement in yields of dialkylamines and the improvement in ratio of dialkylamines to mono- and trialkylamines obtainable, in accordance with my process, may readily be seen by comparing Examples V and VI with Examples I to IV, and comparing Example VIII with Example VII.

It is to be understood, of course, that the above examples are merely illustrative and that my invention is not limited to the particular materials or reaction conditions specified. As has previously been pointed out, my invention is operative with any aldehydes containing at least 2 carbon atoms, and various other reaction conditions may be employed both for the initial condensation reaction, and for the hydrogenation reaction. It will also be evident that my process is adapted for the production of mixed dialkylamines as well as dialkylamines in which the same alkyl group occupies both positions in the molecule. For such purposes it would be desirable to carry out separate reactions employing one aldehyde in one reaction, and the second aldehyde in the other, the formed monoalkylamines being then utilized in the opposite reaction on recycling. Various other modifications of procedure and use of various equivalents will of course occur to those skilled in the art, and it is to be understood that any such modifications or equivalents are included within the scope of my invention.

My invention now having been described, what I claim is:

1. In a cyclic process for the production of dialkylamines comprising condensing an aliphatic aldehyde having in excess of one carbon atom with a mixture of ammonia and a monoalkylamine, subjecting the condensation product resulting therefrom to hydrogenation at a temperature below that causing decomposition thereof, separating the monoalkylamine from the alkylamines thus formed, and introducing said monoalkylamines into the reaction mixture for the succeeding cycle, the step which comprises condensing an aldehyde with said mixture of ammonia and monoalkylamine, wherein ammonia and monoalkylamine are present in a ratio of .75 mol to 1.0 mol of ammonia per mol of monoalkylamine.

2. In a cyclic process for the production of dialkylamines comprising condensing an aliphatic aldehyde having in excess of one carbon atom with a mixture of ammonia and monoalkylamine, subjecting the condensation product resulting therefrom to hydrogenation at a temperature below that causing decomposition thereof, separating the monoalkylamine from the alkylamines thus formed, and introducing said monoalkylamine into the reaction mixture for the succeeding cycle, the step which comprises condensing said mixture of ammonia and monoalkylamine, wherein ammonia and monoalkylamine are present in a ratio of .75 mol to 1.0 mol of ammonia per mol of monoalkylamine, with .85 mol to 1.0 mol of aldehyde per mol of total bases.

3. In a cyclic process for the production of diethylamine comprising condensing acetaldehyde with a mixture of ammonia and ethylamine, subjecting the condensation product resulting therefrom to hydrogenation at a temperature below that causing decomposition thereof, separating the monoethylamine from the ethylamines thus formed, and introducing said monoethylamine into the reaction mixture for the succeeding cycle, the step which comprises condensing said mixture of ammonia and monothylamine, wherein ammonia and monoethylamine are present in a ratio of .75 mol to 1.0 mol of ammonia per mol of monoethylamine, with .85 mol to 1.0 mol of acetaldehyde per mol of total bases.

4. In a cyclic process for the production of dibutylamine comprising condensing butyraldehyde with a mixture of ammonia and monobutylamine, subjecting the condensation product resulting therefrom to hydrogenation at a temperature below that causing decomposition thereof, separating the monobutylamine from the butylamines thus formed, and introducing said monobutylamine into the reaction mixture for the succeeding cycle, the step which comprises condensing said mixture of ammonia and monobutylamine, wherein ammonia and monobutylamine are present in a ratio of .75 mol to 1.0 mol of ammonia per mol of monoalkylamine, with .85 mol to 1.0 mol of butyraldehyde per mol of total bases.

BYRON M. VANDERBILT.